(12) United States Patent
Alacqua et al.

(10) Patent No.: US 7,182,101 B2
(45) Date of Patent: Feb. 27, 2007

(54) DEVICE FOR CONTROLLING THE FLOW OF A FLUID IN ONE OR MORE CONDUITS IN AN ELECTRICAL APPLIANCE, PARTICULARLY IN A DISHWASHER MACHINE

(75) Inventors: Stefano Alacqua, Rivoli Cascine Vica (IT); Francesco Butera, Turin (IT); Gianluca Capretti, Orbassano (IT); Alessandro Zanella, Turin (IT)

(73) Assignee: C. R. F. Societa Consortile Per Azioni, Orbassano (IT)

( * ) Notice: Subject to any disclaimer, the term of this patent is extended or adjusted under 35 U.S.C. 154(b) by 0 days.

(21) Appl. No.: 10/879,740

(22) Filed: Jun. 30, 2004

(65) Prior Publication Data

US 2005/0011563 A1      Jan. 20, 2005

(30) Foreign Application Priority Data

Jul. 17, 2003      (IT)      ........................... TO2003A0553

(51) Int. Cl.
*F16K 1/16* (2006.01)

(52) U.S. Cl. ........................................ 137/875; 251/11

(58) Field of Classification Search ................ 137/875, 137/625.44; 251/11
See application file for complete search history.

(56) References Cited

U.S. PATENT DOCUMENTS

| 3,382,891 | A | * | 5/1968 | Clearman et al. ............ 137/563 |
| 4,284,235 | A | * | 8/1981 | Diermayer et al. ......... 236/1 G |
| 4,388,766 | A | * | 6/1983 | Sanderson .................... 34/566 |
| 4,699,314 | A | * | 10/1987 | Faurie ........................ 236/49.5 |
| 5,165,450 | A | * | 11/1992 | Marrelli ...................... 137/875 |
| 5,865,418 | A | * | 2/1999 | Nakayama et al. ........... 251/11 |

FOREIGN PATENT DOCUMENTS

| EP | 1 241 351 A1 | 9/2002 |
| WO | WO 03/003137 A1 | 1/2003 |

* cited by examiner

*Primary Examiner*—Eric Keasel
*Assistant Examiner*—Craig Schneider
(74) *Attorney, Agent, or Firm*—Sughrue Mion, PLLC

(57) ABSTRACT

A device for controlling the-flow of a fluid in one or more conduits in an electrical appliance, particularly in a dishwasher machine, comprises at least a control member, movable between two or more positions, and shape memory actuator means of control member.

3 Claims, 3 Drawing Sheets

DEVICE FOR CONTROLLING THE FLOW OF A FLUID IN ONE OR MORE CONDUITS IN AN ELECTRICAL APPLIANCE, PARTICULARLY IN A DISHWASHER MACHINE

BACKGROUND OF THE INVENTION

The present invention relates to devices for controlling the flow of a fluid in one or more conduits in an electrical appliance, particularly in a dishwasher machine, of the type comprising at least a control member, movable between two or more positions, and means for actuating said control member.

Devices of this kind are, for example, used in dishwasher machines. In practice, they are distributor devices, with an inlet to receive a flow of water coming from a feed pump and two outlets to send a flow of water respectively to a lower sprayer element and to an upper sprayer element of the dishwasher machine. Inside the device is provided a control member having three different operative positions, respectively corresponding to the deviation of the entire flow of water to the lower sprayer element, to the deviation of the entire flow of water towards the upper sprayer, and to a distribution of the flow between the upper and the lower sprayer elements.

According to the prior art, the control member of the valve is typically commanded by actuator means constituted by a wax actuator or, alternative, by an electric motor.

SUMMARY OF THE INVENTION

The object of the present invention is to enhance known devices, providing them with actuator means having an extremely simple and small sized structure, having a relatively low fabrication and operation cost and nevertheless having efficient and reliable operation.

In view of achieving said object, the invention relates to a device of the type indicated at the start of the present description, characterised in that the aforesaid actuator means are shape memory actuator means.

Actuators using shape memory metal alloys, capable of changing state upon reaching a predetermined transition temperature, have long been known and used in several fields. The present invention proposes a particularly advantageous application of an actuator of this kind to a device for controlling the flow of a fluid in one or more conduits in an electrical appliance, particularly in a dishwasher machine.

In the preferred embodiment of the invention, which refers to the case in which said device for controlling the flow is a distributor device having at least one inlet and at least two outlets and a control member having at least two different operative positions to distribute the flow of fluid between the two outlets, the aforesaid shape memory actuators of the control member can be activated by electrical power supply means. The change of state of the shape memory actuator means is then obtained as a result of the heating that takes place by Joule effect due to the passage of current through the shape memory element.

A typical example of application of the invention provides for the use of a shape memory actuator element constituted by a cable made of a shape memory alloy, interposed between the fixed structure of the device and the control member and capable of undergoing a change in length as a result of reaching its transition temperature. The electrical power supply means cause a passage of current through the cable to obtain its heating.

In a first example, the aforesaid electrical power supply means include means for controlling and adjusting the current fed to the shape memory actuator means, to position the control member in its different operative positions. In this case, the aforesaid adjustment means comprise for example a potentiometer associated to the shape memory actuator means to provide a signal indicating the position of the shape memory actuator means to the aforesaid control and adjustment means to allow closed loop control of the position of the control member.

In an alternative example, to the aforesaid shape memory actuator means is associated a hook mechanism to hold the command member stably in the selected position after each deactivation of the shape memory actuator means. In this second embodiment, differently from the previously mentioned example, it is therefore not necessary to maintain the supply the current through the shape memory actuator to maintain the latter in the selected position, since the hook means maintain the control member in the position it has reached, whatever it is, after an interruption in the supply of current.

A hook mechanism able to be associated to shape memory actuator means to obtain the result described above has been illustrated for example in the previous European patent application EP-A-1 241 351 by the same Applicant.

In regard to the structure of the shape memory actuator means, it can be advantageous to use the actuator disclosed in the Applicant's international patent application WO03/003137. However, said application is only one among possible ones, since it is also possible to a shape memory actuator having any configuration, for example constituted by a simple cable, elongated or wound in a coil, or having any other known configuration.

BRIEF DESCRIPTION OF THE DRAWINGS

Additional characteristics and advantages shall become readily apparent from the description that follows with reference to the accompanying drawings, provided purely by way of non limiting example, in which.

DETAILED DESCRIPTION OF THE INVENTION

Figure 1:
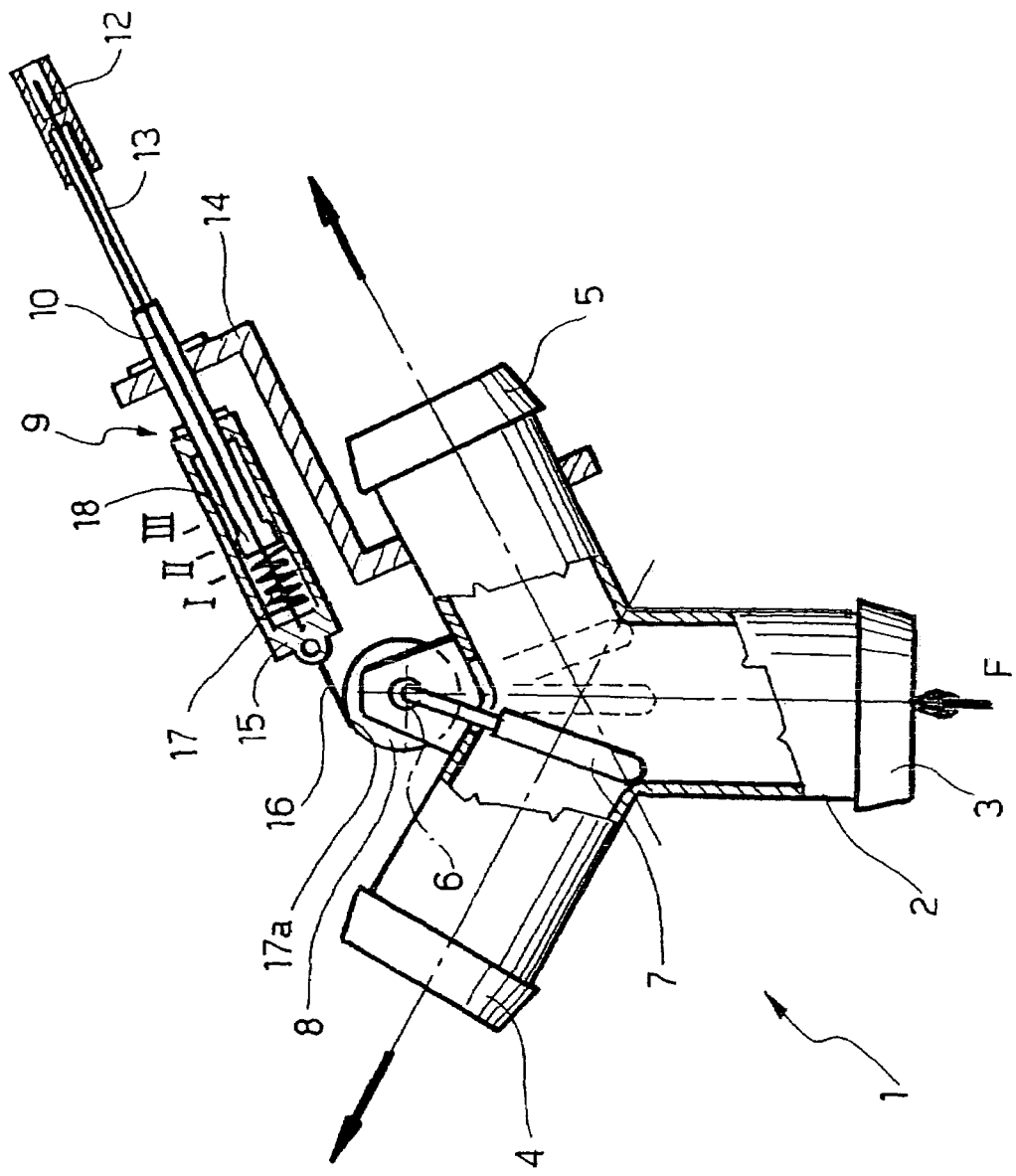
FIG. 1 is a schematic section view of a first embodiment of a flow control device according to the invention.

With reference to FIG. 1, the number 1 globally designates a flow control device having a body 2 with an inlet 3 to receive a flow of water F from a feed pump, and two outlets 4, 5 connected respectively to the lower sprayer element and to the upper sprayer element of a dishwasher machine.

On the body of the control device 1 is mounted oscillating around an axis 6 a control member 7 having three operative positions I, II, III. In the position I, the control member 7 deviates the entire incoming flow towards the outlet 5 connected to one of the two sprayer elements of the dishwasher machine.

In the position II, the control member 7 distributes the incoming flow F between both outlets 4, 5, whilst lastly in the position III the entire flow is deviated towards the output 4.

In the illustrated embodiment, the actuator member 7 is integral in rotation with a disc 8 mounted rotatably on the body of the device around the axis 6, whose angular position is controlled by a shape memory actuator device of the type constituting the subject of the Applicant's international patent application, identified above. Said actuator device, globally designated by the reference number 9, comprises a shape memory wire 10 having an end connected in 12 to a tubular appendage 13 mounted on a bracket 14 fastened to the body of the device. The opposite end of the shaped memory wire 10 is connected to a cylinder 15, in turn connected by means of a rod 16 to a point 17 of the disk 8, at a distance from the axis 6. Electrical power supply means. (not shown) feed an electrical current through the wire 10 to raise temperature by the Joule effect. Upon exceeding a predetermined transition temperature, the shape memory wire 10 shortens, determining a displacement of the cylinder 15, against the action of a spring 17 interposed inside the cylinder 15 between an end wall thereof and a piston 18 integral with the tube 13.

In a first embodiment, the electrical power supply means comprise adjustment and control means able to vary the supplied current to obtain three different positions of the actuator member, corresponding to the operative positions I, II, III of the control member 7. In this case, to the actuator means is associated a potentiometer (not shown) able to serve as a sensor of the movable part of the actuator 9, to allow a closed loop control of the position of the control member 7.

Figure 4:
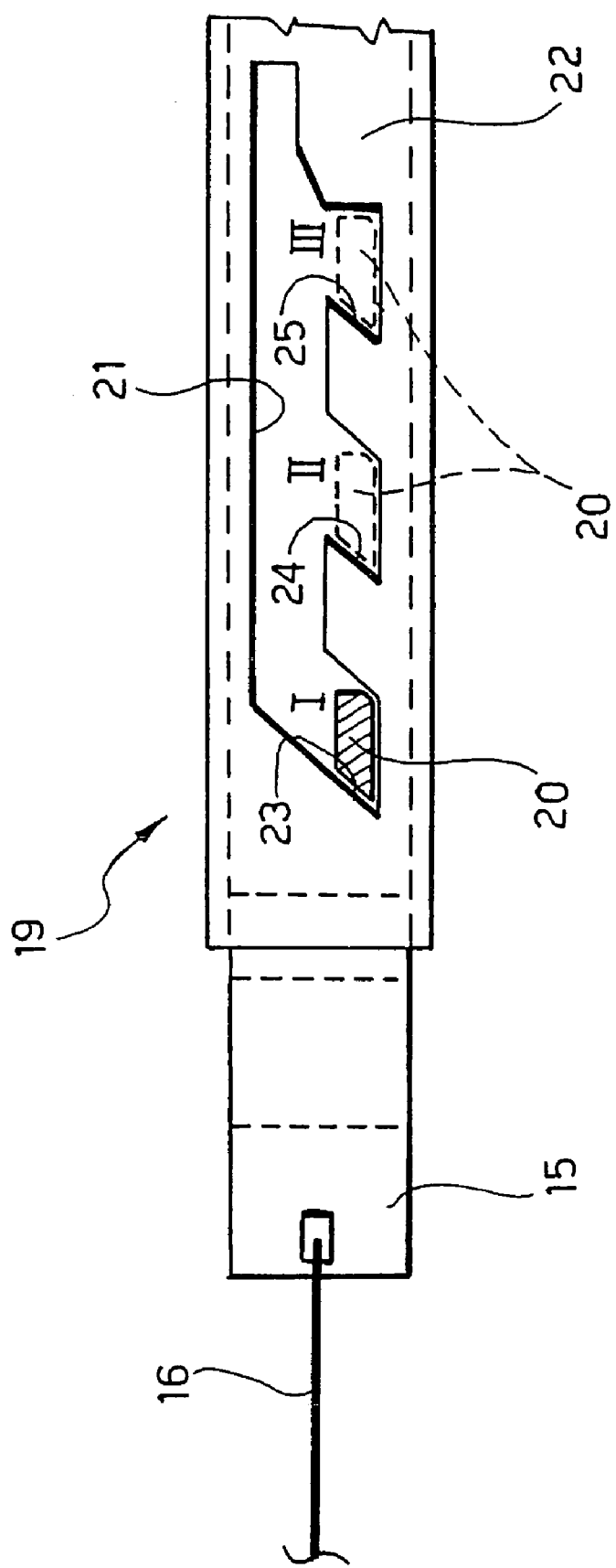
FIG. 4 is a schematic view of the hook mechanism able to be associated to the shape memory actuator means usable in both embodiments of FIGS. 1, 2.

Alternatively, to the actuator device 9 can be associated a hook mechanism of the type designated as 19 in FIG. 4, where the movable part 15 of the actuator 9 has an engagement element 20 which co-operates with a guiding track 21 obtained in a guide element 22 in which are defined three seats 23, 24, 25 destined selectively to receive the engagement element 20 integral with the movable part 15 in correspondence with each selected position of the control member. Thanks to the adoption of said hook mechanism, which in itself is known and similar to the one used for example in ball point pens with push-button command, the supply of electrical current to the shape memory actuator 9 is interrupted after every activation that brought the control member 7 in a new position, since the mechanism 19 stably maintains the control member 7 in the position it reached.

It is also noted that the association to a hook mechanism to a shape memory actuator to make stable all the operator positions of the member commanded by the actuator, has already been illustrated in the Applicant's previous European patent application, identified above.

With reference to the embodiment of FIG. 1, the shape and the arrangement of the shape memory actuator 9 can be different from the one illustrated purely by way of example and in particular it make be in the form of a simple elongated cable or of a spiral, or otherwise shaped, spring, constituted by a shape memory allow.

The means for supplying power to the actuator elements are not illustrated herein and can be constructed in any known fashion.

Figure 2:
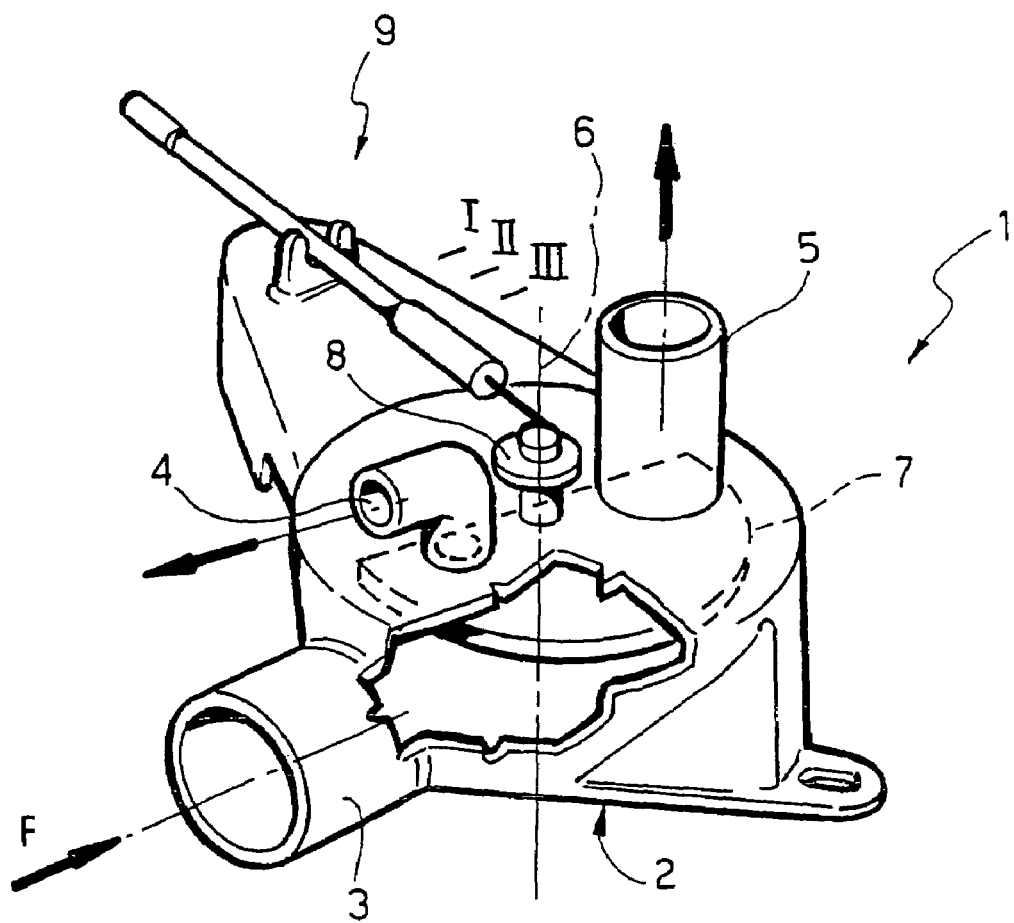
FIG. 2 is a schematic perspective view of a second embodiment.
Figure 3:
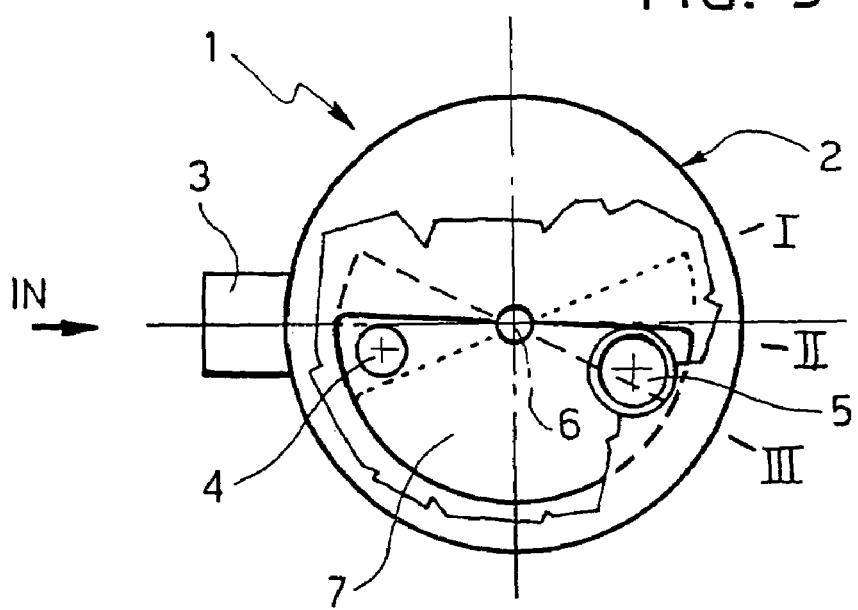
FIG. 3 is a schematic plan view of the device of FIG. 2.

FIGS. 2, 3 illustrated a second embodiment which is conceptually identical to that of FIG. 1 and differs solely in a different shape of the body of the device 1. In these figures, the parts corresponding to those of FIG. 1 are designated by the same reference number.

Naturally, without altering the principle of the invention, the construction details and the embodiments may vary widely from what is described and illustrated purely by way of example herein, without thereby departing from the scope of the present invention.

What is claimed is:

1. A washing machine comprising a water distributing valve having a body defining one inlet and at least two outlets, a passage communicating said inlet with said outlets and a control member arranged within said passage and movable between two end positions in which a flow of water coming from said inlet is deviated into one or the other of said outlets, a support rigidly mounted on said body of the water distributing valve, and a shape memory actuator comprising a wire of a shape memory material having one end connected to said support and the opposite end connected to a driven member which is connected to said movable control member through a mechanical transmission, said washing machine further comprising control means for supplying said shape memory wire with a variable electric current so as to cause three different degrees of heating which cause said control member to be selectively positioned, due to the length variation of the heated shape memory wire, in one or three different operative positions, i.e. said three different operative positions being on of said end positions, the other of said end positions, or in a third position intermediate said end positions, wherein the flow of water coming from the inlet is deviated in both the outlets of the distributing valve, and wherein said control means comprise a potentiometer associated with the shape memory actuator to provide a signal indicating the position of said shape memory actuator.

2. A washing machine as set forth in claim 1, wherein said shape memory actuator comprises a spring biasing said driven member to a rest position when the shape memory wire is not supplied with an electric current.

3. A washing machine as set forth in claim 2, wherein said rest position of the driven member corresponds to one end position of said control member.

* * * * *